(12) United States Patent
Pfanner

(10) Patent No.: US 12,491,117 B2
(45) Date of Patent: Dec. 9, 2025

(54) HEARING PROTECTOR WITH SPECTACLES

(71) Applicant: PFANNER SCHUTZBEKLEIDUNG GMBH, Koblach (AT)

(72) Inventor: Anton Pfanner, Koblach (AT)

(73) Assignee: PFANNER SCHUTZBEKLEIDUNG GMBH, Koblach (AT)

( * ) Notice: Subject to any disclaimer, the term of this patent is extended or adjusted under 35 U.S.C. 154(b) by 0 days.

(21) Appl. No.: 17/045,159

(22) PCT Filed: Mar. 27, 2019

(86) PCT No.: PCT/EP2019/057725
§ 371 (c)(1),
(2) Date: Oct. 2, 2020

(87) PCT Pub. No.: WO2019/192906
PCT Pub. Date: Oct. 10, 2019

(65) Prior Publication Data
US 2021/0212861 A1     Jul. 15, 2021

(30) Foreign Application Priority Data
Apr. 4, 2018   (DE) ............ 10 2018 107 957.5

(51) Int. Cl.
*A61F 11/14* (2006.01)
*A61F 9/02* (2006.01)

(52) U.S. Cl.
CPC .............. *A61F 11/14* (2013.01); *A61F 9/029* (2013.01)

(58) Field of Classification Search
CPC .......... A61F 9/025; A61F 9/029; A61F 11/14; G02C 3/02
See application file for complete search history.

(56) References Cited

U.S. PATENT DOCUMENTS

| | | | |
|---|---|---|---|
| 4,802,243 A | 2/1989 | Griffiths | |
| 4,856,089 A | 8/1989 | Horton | |
| 5,278,999 A | 1/1994 | Brown et al. | |
| 5,289,592 A * | 3/1994 | Paivarinta | A61F 9/025 2/431 |
| 5,323,493 A | 6/1994 | Ogiba | |

(Continued)

FOREIGN PATENT DOCUMENTS

| CN | 104661135 A | 5/2015 |
|---|---|---|
| CN | 205691868 U | 11/2016 |

(Continued)

OTHER PUBLICATIONS

Written Opinion in PCT patent application PCT/EP2019/057725 issued by the European Patent Office made available on WIPO Patentscope Oct. 10, 2019.

(Continued)

*Primary Examiner* — F Griffin Hall
(74) *Attorney, Agent, or Firm* — Shakir Law PLLC; Hassan Abbas Shakir

(57) ABSTRACT

A hearing protector with spectacles includes at least one ear protector and a headband. The spectacles have two temples for fastening the spectacles to the hearing protector. The spectacles are fastenable to the hearing protector by fastening the temples to the headband.

11 Claims, 5 Drawing Sheets

(56) References Cited

U.S. PATENT DOCUMENTS

| | | | | |
|---|---|---|---|---|
| 5,546,610 | A | * | 8/1996 | Herzig .................... A42B 3/166 2/424 |
| 5,724,119 | A | * | 3/1998 | Leight ..................... A61F 9/029 351/158 |
| 9,235,062 | B1 | * | 1/2016 | Desantiago ............ G02C 3/003 |
| 2012/0272484 | A1 | * | 11/2012 | Willborn ................. A61F 9/029 24/3.12 |
| 2013/0047322 | A1 | * | 2/2013 | Peebles ................... A61F 11/14 2/431 |
| 2016/0015566 | A1 | | 1/2016 | Vollet |

FOREIGN PATENT DOCUMENTS

| | | |
|---|---|---|
| DE | 69711279 T2 | 5/2002 |
| DE | 202011109707 U1 | 4/2012 |
| JP | 2008-118401 A | 5/2008 |

OTHER PUBLICATIONS

International Search Report in PCT patent application PCT/EP2019/057725 issued by the European Patent Office on Jun. 13, 2019, official translation provided.

Office Action in German Patent Application 10 2018 107 957 issued by the German Patent Office (DPMA) on Dec. 11, 2018, partial machine translation provided.

Office Action in Chinese Patent Application 201980024309.5 issued Nov. 30, 2021 by the China National Intellectual Property Administration, English language translation and original version provided, 19 pgs.

Office Action in Japanese Patent Application 2020-553603 prepared by the Japanese Patent Office and having mailing date of Oct. 26, 2021, English translation and Japanese language version provided, 12 pgs.

Office Action in Australian Patent Application 2019248563 prepared by IP Australia and having a report date of Mar. 29, 2021, in English, 4 pgs.

Office Action in European Patent Office Patent Applictaion 19715033.7-1202 prepared by the European Patent Office, Sep. 13, 2021, 6 pgs.

Office Action in New Zealand Patent Application 768742 prepared by the New Zealand Intellectual Property Office and having a report date of Apr. 12, 2022, 4 pgs.

Office Action in New Zealand Patent Application 768742 prepared by the New Zealand Intellectual Property Office and having a report date of Jun. 22, 2022, 3 pgs.

Office Action in related Canadian Patent Application No. 3,095,661 prepared by the Canadian Intellectual Property Office and having a date of May 18, 2023, 3 pgs, in English.

Examination Search Report n related Canadian Patent Application No. 3,095,661 prepared by the Canadian Intellectual Property Office and having a date of Apr. 14, 2023 , 1 page and is appended to Office Action n related Canadian Patent Application No. 3,095,661 prepared by the Canadian Intellectual Property Office and having a date of May 18, 2023.

\* cited by examiner

HEARING PROTECTOR WITH SPECTACLES

BACKGROUND OF THE INVENTION

1. Field of the Invention

The invention relates to a hearing protector with spectacles, the hearing protector comprising at least one ear protector and a headband, and the spectacles having two temples for fastening the spectacles to the hearing protector.

2. Discussion of the Related Art

Such a hearing protector is used particularly in environments in which the hearing and eyes or face of persons are to be protected. In this way, for example, improved safety at the workplace is ensured, for example for forestry workers, at construction sites or in other occupations involving a risk for the hearing and eyes of persons. Likewise, spectacles having tinted glasses are used as sun protection.

Here, the term "hearing protector" is used. This is to be understood in a very general sense. It also relates to devices provided for communication or also only for listening to music or for other communication purposes. Also conventional headphones with earpieces and headbands are, insofar, a "hearing protector" in the meaning of the present disclosure. The generic convergence between "hearing protector" and "headphones" becomes apparent in that modern hearing protection equipment is frequently provided with communication means. In other words, the protecting ear protectors frequently contain a loudspeaker and possibly an interface with a microphone to enable the persons involved to communicate.

A generic hearing protector is known from the U.S. Pat. No. 4,802,243. To the headband of the hearing protector, support brackets are attached. They support the ear protectors. Spectacles are also pivotably fixed to the support brackets. This is a comparably elaborate design.

SUMMARY OF THE INVENTION

It is the object of the invention to further develop a generic hearing protector so that a design which is as simple as possible is provided. In addition, the option of versatility in equipping the hearing protector is to be achieved.

This object is solved by the features of the independent claim. Advantageous embodiments of the invention are indicated in the dependent claims.

The invention is based on the generic hearing protector in that the attachment of the spectacles to the hearing protector is realised by fastening the temples to the headband. The attachment of the spectacles to the headband of the hearing protector is the basis of a particularly simple structural solution. The point of attachment of the spectacles to the hearing protector is preferably so far remote from an ear protector which can be connected to the headband that the spectacles and the ear protector can be moved independently and, in particular, do not interfere with each other in their movement. It is not necessary to provide the hearing protector with support brackets for the ear protectors which themselves offer the option to attach the spectacles to them. Rather, the hearing protector can be provided with various support brackets, for the interface between the spectacles and the hearing protector is allocated to the structural base element of the hearing protector, namely the headband. Therefore it is ultimately the structural design of the headband and spectacles on which the basic concept of the invention is based. With this as a starting point, the hearing protector has a high structural variability. It is to be noted that, apart from the different types of hearing protectors mentioned in the introduction, namely without communication means, including communication means or as simple headphones, also, various spectacles can be deployed. The spectacles may, for example, have a solely mechanical protective function, they may have open edges to enable a good rear ventilation. They may be closed at the edges to also prevent the entry of any detrimental substances, for example of chemicals, from the edges. The spectacles may provide for sun protection. The spectacles may also be an optical aid, i.e., they may be provided with so-called optical glasses. The spectacles may also be designed so that they can be referred to as a visor. In this case, a full-face visor or a half visor may be provided. All of the abovementioned features of the spectacles can be combined partly or in their entirety.

Usefully, it is contemplated that the headband comprises at least one pivoting axis on which the at least one ear protector is pivotably supported, and that one temple is attached to the at least one pivoting axis. The pivoting axis provided on the ear protector serves to render the hearing protector comfortably fittable, and it provides for a variable and thereby secure attachment of the hearing protector to the ears of the wearer. According to this embodiment, the pivoting axis fulfils a dual function. It is not only intended for fastening the ear protectors, but also for fastening the spectacles. In this way, a particularly simple and efficient design is provided for.

Further, it is particularly advantageous that the at least one pivoting axis is provided with receptacles at its ends and that the temples are attached to the at least one pivoting axis via mating parts fitting into the receptacles. The mating parts provided on the spectacles fit into the receptacles of the pivoting axis so that, in this way, a secure support of the spectacles on the headband is ensured. The mating parts are disposed on bracket-like end portions of the temples, the bracket-like end portions positively and/or frictionally clasping the headband.

Here, it is of advantage that the mating parts are plugs.

The invention is further developed in a particularly useful way in that at least one temple is comprised of at least two parts, a headband part being jointedly coupled to a temple front portion. Owing to the multi-partition of the temple, the spectacles will, on the one hand, remain fixedly attached to the headband. At the same time, the spectacles are movable so that they may, for example, be pivoted out of the field of view of the wearer, for example upwards. In this connection, the dimensions of the interconnected parts of the temples are selected so that the spectacles can remain in an upper position without falling down again by their own weight. The articulated design of the temples also improves the fit of the spectacles because the joints allow for a stably safe fit of the spectacles even in case of different facial shapes.

It is particularly useful that at least one temple is comprised of at least three parts, a headband part being jointedly coupled to an intermediate part, and a temple front portion being slidably supported in the intermediate part. In this way, the spectacles are not only pivotably attached to the headband, but the length of the temples is adjustable as well. In this way, the fit of the spectacles can be varied, for example to choose among various different settings under different working conditions. Furthermore, it can be ensured in this way that the hearing protector fits any wearer. The articulation may also be provided between the temple front portion and the intermediate part with the slidability then being disposed between the headband part and the intermediate part.

In this connection, it is advantageous that the temple front portion can assume at least two latched positions in the intermediate part. The latched positions ensure that the lengths of the temples do not vary unintentionally.

Furthermore, the hearing protector according to the invention may be designed so that the at least one ear protector is supported on the at least one pivoting axis via a bifurcated support bracket. The bifurcated support brackets are pivotably connected to the headband via the pivoting axis on which the spectacles are fixed as well. The actual ear protectors can be readily mounted in the support brackets.

In this connection, it is particularly useful that the ear protector is supported on the support brackets via two plugs. The support of the ear protector on the support brackets via plugs allows for the ear protector to be pivotable in the support bracket.

The invention further relates to spectacles for use with a hearing protector according to the invention.

The invention further relates to a headband for use with a hearing protector according to the invention.

BRIEF DESCRIPTION OF THE INVENTION

The invention will now be explained by way of example with the aid of particularly preferred embodiments with reference to the accompanying drawings.

DETAILED DESCRIPTION OF THE INVENTION

Figure 1:
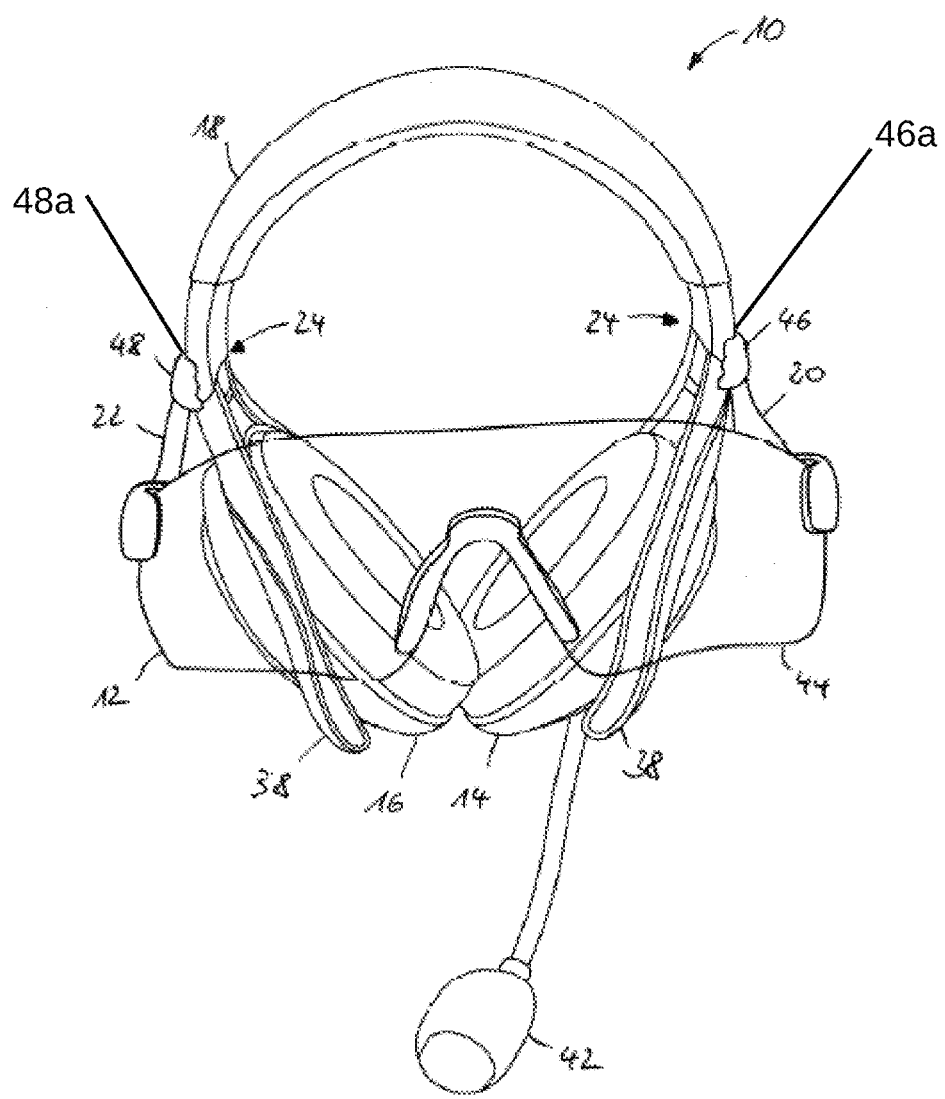
FIG. 1 shows a front view of a hearing protector according to the invention.

In the following description of the drawings, the same reference numerals designate identical or comparable components.

FIG. 1 shows a front view of a hearing protector 10 according to the invention. The hearing protector 10 comprises a headband 18. To the headband 18, support brackets 38 are jointedly attached. The pivoting axes 24 providing for the articulation extend substantially in the viewing direction of the observer of FIG. 1. To the support brackets 38, ear protectors 14, 16 are jointedly attached. The articulation is provided for by plugs 40 and corresponding receptacles on the ear protectors 14, 16. Neither the plugs nor the receptacles can be seen in the illustration since they are hidden by the support brackets 38 or the ear protectors 14, 16. One ear protector 14 is an ear protector provided with communication means. It contains a loudspeaker, and a microphone 42 is connected to it. The communication means may operate via a wireless radio communication interface, for example a Bluetooth interface. The other ear protector 16 is a passive ear protector, i.e. it is only intended for the protection of the ear, and it does not include any communication means. It is also possible that the other ear protector 16, similar to the first ear protector 14, is also provided with communication means. In another variant, one of the ear protectors, for example the first ear protector 14, is provided with communication means as described while the other ear protector, for example the ear protector 16, allows for listening to music, for example by means of a digital radio function. It does not necessarily have to be integrated in the ear protector 16 but may be provided for making use of a digital radio function of a mobile telephone, particularly of a smartphone so that it is sufficient that equipment for receiving, possibly also for transmitting, as well as equipment for reproducing sound are provided in the ear protector 16. To the headband 18, further, spectacles 12 are attached. Said spectacles 12 comprise, apart from other components, a transparent Glass 44 as well as temples 20, 22 attached thereto. On the ends of the temples 20, 22, bracket-like retainers 46, 48 are provided. These retainers 46, 48 partly clasp the headband 18.

Figure 2:
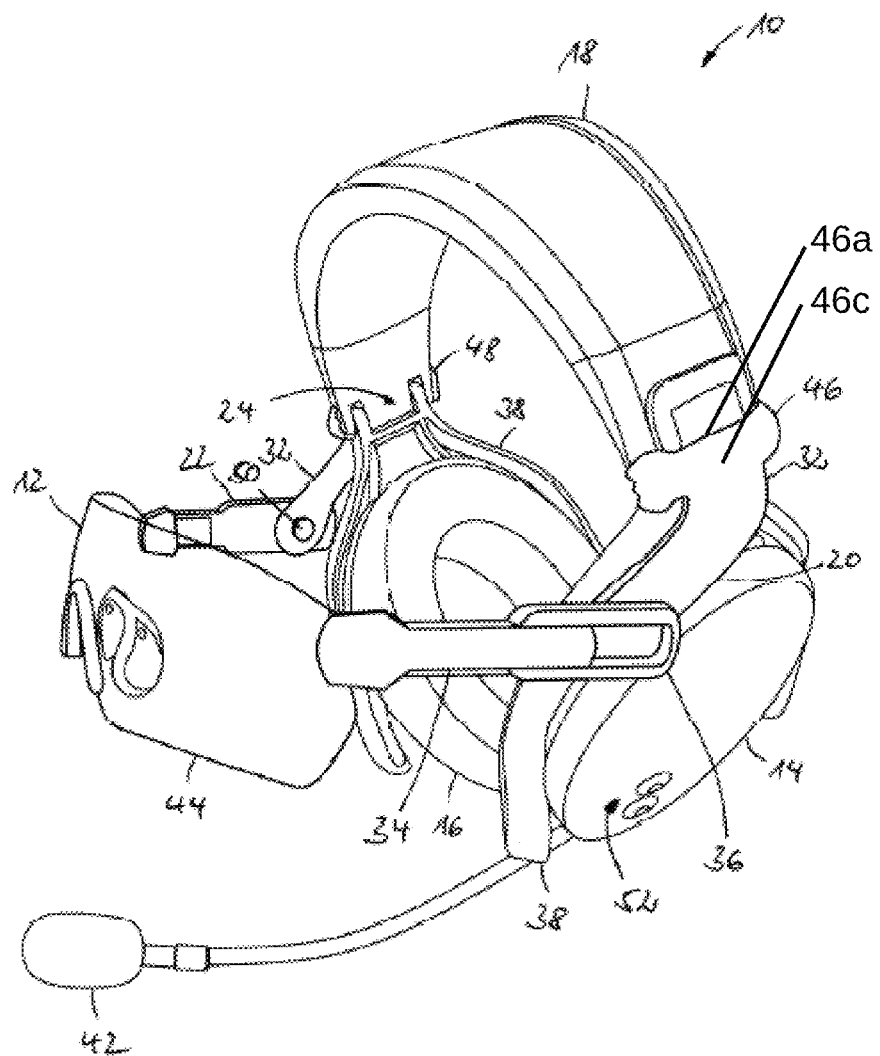
FIG. 2 shows a perspective side view of a hearing protector according to the invention.

FIG. 2 shows a perspective side view of a hearing protector 10 according to the invention. Here, the multi-partition of the temples 20, 22 can be seen. Each temple 20, 22 comprises a headband part 32, the retainer 46, 48 by means of which the temples 20, 22 are connected to the headband 18 being provided on the end of each headband part 32. Each headband part 32 is connected to an intermediate part 36 via respectively one joint axis 50. These joint axes 50 allow for the spectacles 12 to be pivoted upwards, i.e. in the direction towards the headband 18. The intermediate parts 36 slidably accommodate temple front portions 34. An intermediate position is illustrated. The temple front portion 34 may be pulled further out of the intermediate part 36 or pushed further into the intermediate part 36. In this way, the length of the temples 20, 22 as a whole is changed. FIG. 2 further shows, in some detail, at which position, relative to the retainers 46, 48 of the temples 20, 22, the pivoting axis 24 is positioned by means of which the support brackets 38 are connected to the headband 18. Specifically, the pivoting axis 24 connects the bracket-like extensions of the retainers 46, 48. The active ear protector 14 is provided with control elements 52 for controlling communication on its outer side.

Figure 3:
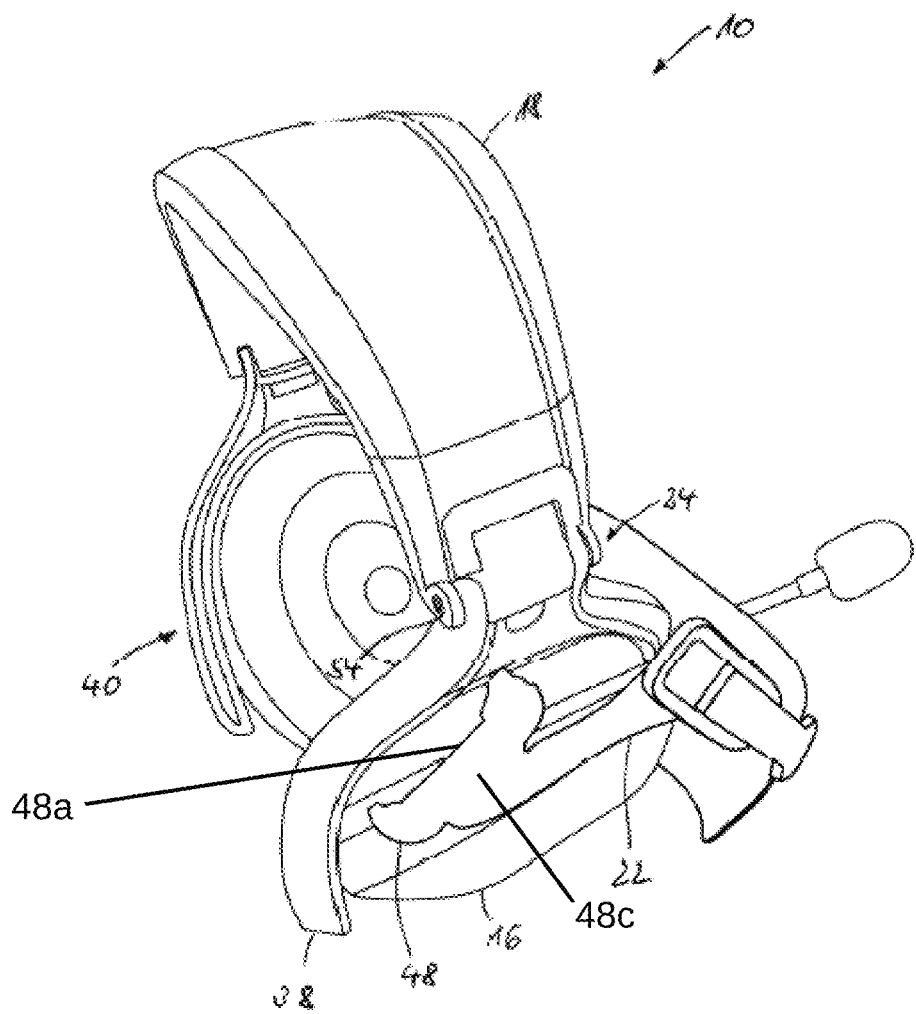
FIG. 3 shows a perspective side view of a hearing protector according to the invention with the spectacles being detached from the headband on one side.

FIG. 3 shows a perspective side view of a hearing protector 10 according to the invention, the spectacles 12 being detached from the headband 18 on one side. With the retainer 48 detached from its attachment the pivoting axis 24 via which the support 38 is connected to the support brackets 18 can now be seen in more detail. Such a pivoting axis 24 comprises a pin 54 respectively penetrating one end of the headband 18 as well as the support 38. The ends of each pin 54 are provided with receptacles 26 (see FIG. 5). When the retainers 46, 48 clasp the support brackets 18 in this area plugs 28, 30 (see FIG. 4) are accommodated by the receptacles 54 so that the retainers 46, 48 are securely held on the headband 18.

Figure 4:
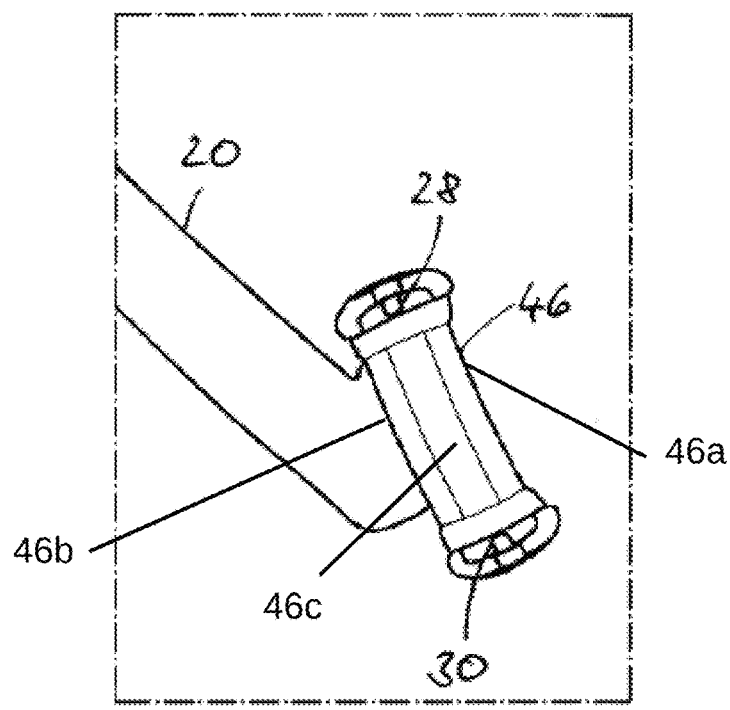
FIG. 4 shows a detail of the fastening arrangement by means of which a temple can be attached to the headband.

FIG. 4 shows a detail of the fastening arrangement with the aid of which a temple 20, 22 can be attached to the headband 18. The retainer 46 formed as a bracket-like end portion of a temple 20 comprises a central portion disposed on the rear side in the viewing direction, as well as two end portions facing the observer in the viewing direction. On the end portions, plugs 28, 30 are disposed which extend substantially in the paper plane of FIG. 4. These plugs 28, 30 are held in the receptacles 26 (see FIG. 5).

Figure 5:
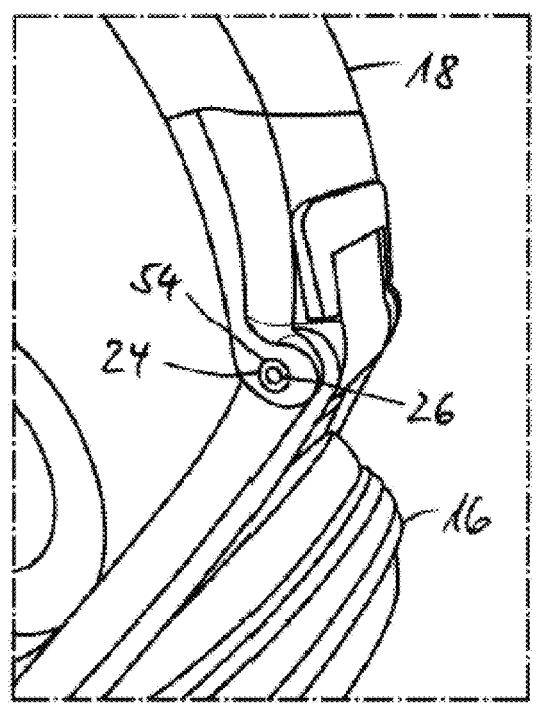
FIG. 5 shows a detail of the fastening arrangement to which a temple can be attached.

FIG. 5 shows a detail of the fastening arrangement to which a temple 20, 22 can be attached. Here, the pin 54 serving as the pivoting axis 24 can be seen at its end and is illustrated by two concentric circles. The inner circle indicates the outer circumference of a receptacle 26 for one of the plugs 28, 30 (see FIG. 4).

In FIG. 4, retainer 46 has a C-shape and has a lateral edge 46a, a lateral edge 46b, and a lateral medial portion 46c.

Figure 6:
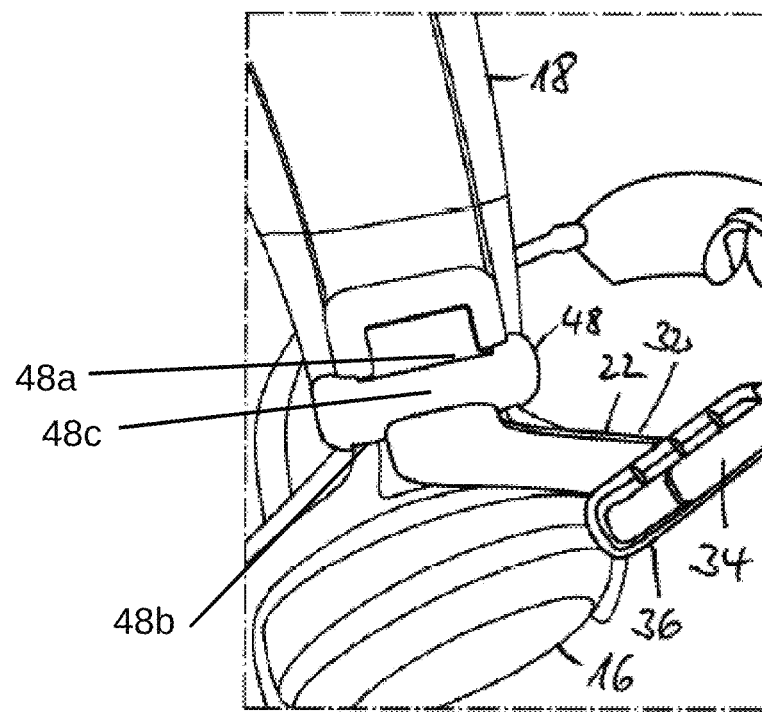
FIG. 6 shows a detail of the hearing protector, the three-part structure of a temple being identifiable.

In FIG. 6, retainer 48 has a C-shape and has a lateral edge 48a, a lateral edge 48b, and a lateral medial portion 48c.

FIG. 6 shows a detail of the hearing protector 10 with the three-part structure of a temple 20, 22 being visible. Insofar, it comprises a headband part 32 with a retainer 48, an intermediate part 36 and a temple front portion 34. The intermediate part 36 has three marks indicating the latched positions of the temple front portion 34 in the intermediate part 36.

Figure 7:
FIG. 7 shows a person wearing the hearing protector.

FIG. 7 shows a person wearing the hearing protector 10.

The features of the invention disclosed in the above description, in the drawings as well as in the claims may be relevant for the implementation of the invention both individually and in any combination.

LIST OF NUMERALS 10 hearing protector
12 spectacles
14 ear protector
16 ear protector
18 headband
20 temple
22 temple
24 pivoting axis
26 receptacles
28 plug
30 plug
32 headband part
34 temple front portion
36 intermediate part
38 support bracket
40 plug
42 microphone
44 glass
46 retainer
48 retainer
50 joint axis
52 control element
54 pin

What is claimed is:

1. In combination, a hearing protector and spectacles, the combination comprising:
the hearing protector comprising a first ear protector and a headband, the headband having a first distal end and a second distal end, the second distal end being opposed to the first distal end;
a first bifurcated bracket supporting the first ear protector, the first bifurcated bracket pivotably mounted to the first distal end of the headband and defining a first pivoting axis relative to the headband, and
the spectacles comprising
a first temple arm,
a C-shaped retainer having a first lateral edge, a second lateral edge, and a first lateral medial portion, the first lateral edge and the second lateral edge defining the first lateral medial portion therebetween,
the C-shaped retainer being an end portion of the first temple arm and being removably attached over the first distal end at the first pivoting axis,
wherein the first distal end of the headband comprises receptacles at the first pivoting axis,
wherein the first temple arm is attached at the first pivoting axis via mating parts fitting into the receptacles, and
wherein the mating parts are plugs.

2. The combination according to claim 1,
wherein the first temple arm comprises at least two parts: a headband part and a temple front portion, the temple front portion being jointedly coupled to the headband part.

3. The combination according to claim 1,
wherein the first temple arm comprises at least three parts: a headband part, an intermediate part jointedly coupled to the headband part, and a temple front portion slidably supported in the intermediate part.

4. The combination according to claim 1, wherein the first temple arm comprises a temple front portion and an intermediate part, the temple front portion being capable of being latched in at least two positions.

5. The combination of claim 1, further comprising a wireless radio communication interface and a control element, the control element being disposed on an outer side of the first ear protector for controlling communication via the wireless radio communication interface.

6. The combination of claim 1,
wherein the hearing protector comprises a second ear protector, and
the combination further comprises
a second bifurcated bracket supporting the second ear protector, the second bifurcated bracket pivotably mounted to the second distal end of the headband and defining a second pivoting axis relative to the headband, and
the spectacles comprising
a second temple arm, an end portion of the second temple arm being removably attached over the second distal end at the second pivoting axis,
a C-shaped retainer having a third lateral edge, a fourth lateral edge, and a second lateral medial portion, the third lateral edge and the fourth lateral edge defining the second lateral medial portion therebetween.

7. A protective device for a user, the protective device comprising:
a hearing protector comprising a first ear protector and a headband, the headband having a first distal end and a second distal end, the second distal end being opposed to the first distal end;
a first bifurcated bracket supporting the first ear protector, the first bifurcated bracket pivotably mounted at a first pivot to the first distal end of the headband and defining a first pivoting axis relative to the headband; and
an eye protector comprising
a first temple arm adapted to be disposed proximate to a first temple of the user, and
a C-shaped retainer having a first lateral edge, a second lateral edge, and a first lateral medial portion, the first lateral edge and the second lateral edge defining the first lateral medial portion therebetween,
wherein the C-shaped retainer is an end portion of the first temple arm and is removably attached over the first distal end at the first pivoting axis,
wherein the first distal end of the headband comprises receptacles at the first pivoting axis,
wherein the first temple arm is attached at the first pivoting axis via mating parts fitting into the receptacles, and
wherein the mating parts are plugs.

8. The protective device of claim 7, further comprising a second temple arm adapted to be disposed proximate to a second temple of the user, and a second bifurcated bracket supporting a second ear protector, the second bifurcated bracket pivotably mounted at a second pivot to the second distal end of the headband and defining a second pivoting axis relative to the headband.

9. The protective device of claim 7, wherein the first pivot comprises a pin.

10. The protective device of claim 7, further comprising a wireless radio communication interface and a control element, the control element being disposed on an outer side of the first ear protector for controlling communication via the wireless radio communication interface.

11. A protective device for a user, the protective device comprising:
- a hearing protector comprising a first ear protector and a headband, the headband having a first distal end and a second distal end, the second distal end being opposed to the first distal end;
- a first bifurcated bracket supporting the first ear protector, the first bifurcated bracket pivotably mounted at a first pivot to the first distal end of the headband and defining a first pivoting axis relative to the headband; and
- a second bifurcated bracket supporting a second ear protector, the second bifurcated bracket pivotably mounted at a second pivot to the second distal end of the headband and defining a second pivoting axis relative to the headband;
- an eye protector comprising
  - a first temple arm adapted to be disposed proximate to a first temple of the user, and
  - a second temple arm adapted to be disposed proximate to a second temple of the user,
- wherein the first distal end of the headband comprises receptacles at the first pivoting axis,
- wherein the first temple arm is attached at the first pivoting axis via mating parts fitting into the receptacles, and
- wherein the mating parts are plugs.

* * * * *